US010688397B2

(12) United States Patent
Sato et al.

(10) Patent No.: US 10,688,397 B2
(45) Date of Patent: Jun. 23, 2020

(54) INFORMATION PROCESSING DEVICE, NON-TRANSITORY COMPUTER READABLE MEDIUM, AND INFORMATION PROCESSING METHOD

(71) Applicant: DeNA Co., Ltd., Shibuya-ku, Tokyo (JP)

(72) Inventors: Ryota Sato, Tokyo (JP); Atsushi Nishide, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 250 days.

(21) Appl. No.: 15/912,354

(22) Filed: Mar. 5, 2018

(65) Prior Publication Data
US 2018/0250597 A1 Sep. 6, 2018

(30) Foreign Application Priority Data

Mar. 6, 2017 (JP) .................. 2017-041403

(51) Int. Cl.
*A63F 13/69* (2014.01)
*A63F 13/35* (2014.01)
(Continued)

(52) U.S. Cl.
CPC .............. *A63F 13/69* (2014.09); *A63F 13/35* (2014.09); *G07F 17/3255* (2013.01); *G07F 17/3293* (2013.01)

(58) Field of Classification Search
CPC ...... A63F 13/69; A63F 13/35; G07F 17/3255; G07F 17/3293
See application file for complete search history.

(56) References Cited

U.S. PATENT DOCUMENTS 6,117,009 A * 9/2000 Yoseloff .............. G07F 17/3244
273/138.1
6,159,096 A * 12/2000 Yoseloff .............. G07F 17/3244
273/138.1
(Continued)

FOREIGN PATENT DOCUMENTS

| JP | 2014-090974 A | 5/2014 |
| JP | 5749838 B1 | 5/2015 |
| JP | 2015-150070 A | 8/2015 |

OTHER PUBLICATIONS

Office Action for Related Japanese Patent Application No. 2017-041403 dated Sep. 5, 2017; 10 pages; English translation provided.

*Primary Examiner* — David L Lewis
*Assistant Examiner* — Matthew D Hoel
(74) *Attorney, Agent, or Firm* — Procopio, Cory, Hargreaves & Savitch LLP

(57) ABSTRACT

A device includes: a memory storing a deck having multiple game content objects with levels of rarity; a lottery game processing module conducting a lottery drawing for selecting a particular game content object from game content objects of a rarity level or higher among all the game content objects contained in the deck in response to a lottery drawing operation by the player, and awards the game content object selected in this lottery drawing to the player; and an update processing module which, each time the lottery drawing is conducted, performs an update of the deck by deleting the game content object awarded to the player among the game content objects of at least the preset rarity level and game content objects not awarded to the player among the game content objects, excluding the highest-rarity game content objects from the game content objects of the preset rarity level or higher.

18 Claims, 10 Drawing Sheets

(51) Int. Cl.
*A63F 13/32* (2014.01)
*G07F 17/32* (2006.01)

(56) References Cited

U.S. PATENT DOCUMENTS

| | | | |
|---|---|---|---|
| 6,179,711 B1 * | 1/2001 | Yoseloff | G07F 17/32 |
| | | | 273/138.1 |
| 6,986,709 B2 * | 1/2006 | Hughs-Baird | G07F 17/32 |
| | | | 463/16 |
| 7,104,889 B2 * | 9/2006 | Nelson | G07F 17/32 |
| | | | 463/25 |
| 7,198,569 B2 * | 4/2007 | Wolf | G07F 17/3227 |
| | | | 463/12 |
| 9,582,969 B2 | 2/2017 | Kuroda et al. | |
| 2014/0128164 A1 | 5/2014 | Ukai et al. | |

\* cited by examiner

FIG. 3

| Character ID | Character Name | Rarity Level | Maximum Attack Strength | Maximum Defense Strength | Maximum Hit Point Value | Initial Attack Strength | Initial Defense Strength | Initial Hit Point Value |
|---|---|---|---|---|---|---|---|---|
| 0001 | Character A | R1 | 1500 | 800 | 1000 | 15 | 8 | 10 |
| 0002 | Character B | R2 | 3000 | 2000 | 1500 | 30 | 20 | 15 |
| 0003 | Character C | R3 | 4500 | 3000 | 2500 | 45 | 30 | 25 |
| 0004 | Character D | R4 | 6000 | 5500 | 6000 | 60 | 55 | 60 |
| . | . | . | . | . | . | . | . | . |
| . | . | . | . | . | . | . | . | . |
| . | . | . | . | . | . | . | . | . |

FIG 4

| Player ID | Player Name | Game Points | Proprietary Character Information | Deck Information | Total Number of Deletions |
|---|---|---|---|---|---|
| 0001 | Player A | 100 | Proprietary Character Information (1) | Deck Information (1) | 3/15 |
| 0002 | Player B | 50 | Proprietary Character Information (2) | Deck Information (2) | 1/15 |
| 0003 | Player C | 30 | Proprietary Character Information (3) | Deck Information (3) | 5/15 |
| . . . | . . . | . . . | . . . | . . . | . . . |

FIG. 5

| Proprietary Character Information (1) / (2) / (3) | | | | | |
|---|---|---|---|---|---|
| Character ID | Level | Attack Strength | Defense Strength | Hit Point Value | |
| 0011 | Lv. 3 | 25 | 100 | 60 | |
| 0211 | Lv. 4 | 70 | 40 | 80 | |
| 0133 | Lv. 7 | 60 | 300 | 100 | |
| . | . | . | . | . | |
| . | . | . | . | . | |
| . | . | . | . | . | |

FIG. 6

| Deck Information (1) / (2) | | | | |
|---|---|---|---|---|
| Item ID | Rarity Level | Total Number of Characters Contained | Current Number of Characters Contained | |
| 0011 | R5 | 1 | 1 | |
| 0002 | R4 | 2 | 2 | |
| 0023 | R3 | 4 | 4 | |
| 0084 | R3 | 4 | 4 | |
| 0031 | R2 | 5 | 5 | |
| 0022 | R2 | 5 | 5 | |
| 0153 | R2 | 5 | 5 | |
| . | . | . | . | |
| . | . | . | . | |
| . | . | . | . | |

INFORMATION PROCESSING DEVICE, NON-TRANSITORY COMPUTER READABLE MEDIUM, AND INFORMATION PROCESSING METHOD

This application claims foreign priority under 35 USC 119 based on Japanese Patent Application No. 2017-041403, filed on Mar. 6, 2017, the contents of which is incorporated herein in its entirety by reference.

BACKGROUND

1. Field

The present invention relates to an information processing device, a non-transitory computer-readable medium including instructions to be performed on a processor, wherein the instruction may be associated with a game, and an information processing method.

2. Related Art

A game program is known in which a lottery drawing that selects a particular game content object from all the game content objects contained in a deck is performed in response to a player's lottery drawing operation, the game content object selected in this lottery drawing is awarded to the player, and, at the same time, a deck update is performed by deleting the game content object awarded to this player whenever such a lottery drawing is conducted (e.g., see Patent Document 1).

PRIOR ART DOCUMENTS

Patent Documents

[Patent Document 1]
Japanese Patent Publication No. 5,749,838.

SUMMARY

Problems to be Solved by the Invention

Such a game program is configured to progressively reduce the number of game content objects in the deck when lottery drawings are conducted in a repeated manner and game content objects are successively awarded to the player. Consequently, if no game content objects are left in the deck, the player can reliably acquire desired game content objects.

Incidentally, when the total number of game content objects that a player wants to acquire is small, it may be difficult for the player to readily acquire the desirable game content objects even if lottery drawings are conducted in a repeated manner and the number of game content objects in the deck is progressively reduced, which creates a risk that the player's motivation for acquiring objects will be reduced.

The present invention has been devised by taking such circumstances into account and it is an object of the invention to make it easier for the player to acquire desirable game content objects from the deck.

Means for Solving the Problems

The primary invention of the present invention for solving the above-described problems is an information processing device provided with:

a memory module which stores a deck containing multiple game content objects having rarity levels classified according to scarcity values;

a lottery game processing module which conducts a lottery drawing for selecting a particular game content object from game content objects of a preset rarity level or higher among all the game content objects contained in the deck in response to a lottery drawing operation by the player and awards the game content object selected in this lottery drawing to the player; and an update processing module which, each time the lottery drawing is conducted, performs an update of the deck by deleting the game content object awarded to the player among the game content objects of the preset rarity level or higher and, at the same time, additionally deleting game content objects not awarded to the player among the game content objects, excluding the highest-rarity game content objects from the game content objects of the preset rarity level or higher.

Other features of the present invention will become apparent from the present Specification and the accompanying Drawings.

BRIEF DESCRIPTION OF THE DRAWINGS

FIG. 3 A diagram illustrating an exemplary data structure of character information.

FIG. 4 A diagram illustrating an exemplary data structure of player information.

FIG. 5 A diagram illustrating an exemplary data structure of proprietary character information.

FIG. 6 A diagram illustrating an exemplary data structure of deck information.

DETAILED DESCRIPTION

Figure 1:
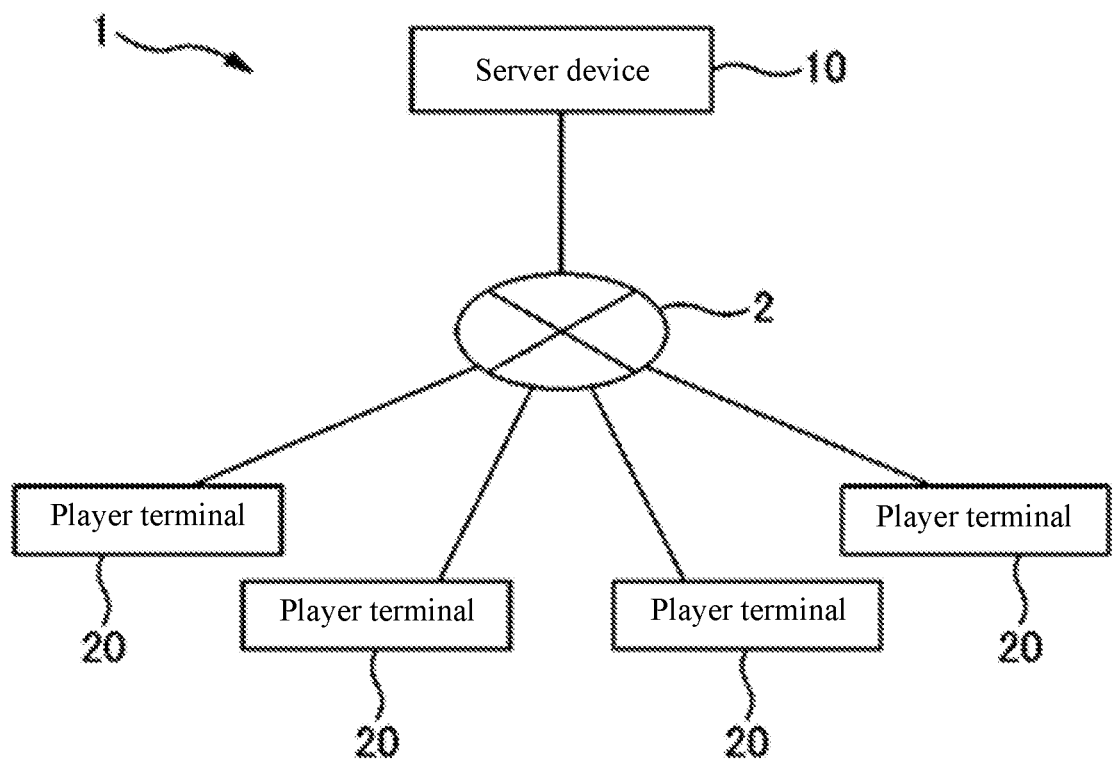
FIG. 1 A diagram illustrating an exemplary configuration of the entire game system 1.

At least the following will become apparent from the present Specification and the accompanying Drawings.

Specifically, an information processing device is provided with:

a memory module which stores a deck containing multiple game content objects having rarity levels classified according to scarcity values;

a lottery game processing module which conducts a lottery drawing for selecting a particular game content object from game content objects of a preset rarity level or higher among all the game content objects contained in the deck in response to a lottery drawing operation by the player and awards the game content object selected in this lottery drawing to the player; and an update processing module which, each time the lottery drawing is conducted, performs an update of the deck by deleting the game content object awarded to the player among the game content objects of the preset rarity level or higher and, at the same time, additionally deleting game content objects not awarded to the player among the game content objects, excluding the highest-rarity game content objects from the game content objects of the preset rarity level or higher.

When such an information processing device is used, as a result of conducting a lottery game during which game content objects of a preset rarity level or higher (in other words, high-rarity game content objects) can be reliably acquired from the deck, not only are high-rarity game content objects awarded to the player in the lottery drawing deleted from the deck, but high-rarity game content objects that have not been awarded to this player (except for the highest-rarity game content objects in the deck) are also additionally deleted from the deck. Consequently, if lottery drawings are conducted in a repeated manner, game content objects other than the highest-rarity game content objects among the game content objects of the preset rarity level or higher are successively deleted from the deck. As a result, it becomes easier to acquire the highest-rarity game content objects (in other words, the game content objects the player wants to acquire) from this deck even without increasing the total number of the highest-rarity game content objects contained in the deck.

In addition, in such an information processing device, each time the above-mentioned lottery drawing is conducted, the update processing module may perform an update of the deck by deleting the game content object awarded to the player among the game content objects of the preset rarity level or higher, and, at the same time, additionally deleting game content objects not awarded to the player among the game content objects of the preset rarity level.

When such an information processing device is used, the game content objects additionally deleted from the deck are limited exclusively to game content objects of the preset rarity level. Consequently, since only game content objects of the preset rarity level are additionally deleted from the deck each time a lottery drawing is conducted, game content objects of the preset rarity level become less likely to be selected from this deck in a lottery drawing. In other words, it becomes easier to acquire the highest-rarity game content objects from this deck.

In addition, in such an information processing device, the device may be provided with a deletion number lottery processing module that uses a lottery drawing to determine the number of the additionally deleted game content objects not awarded to the player, and the update processing module may perform an update of the deck by additionally deleting game content objects not awarded to the player according to the quantity determined by the deletion number lottery processing module in the lottery drawing.

When such an information processing device is used, the number of game content objects additionally deleted from the deck varies depending on the drawing, which can add to the player's feeling of anticipation.

In addition, in such an information processing device, the lottery game processing module, in response to continuous drawing operations used to conduct multiple lottery drawings in a successive manner, may conduct only one lottery drawing that selects a particular game content object from the game content objects of the preset rarity level or higher among all the game content objects contained in the deck, and, along with awarding one game content object selected in this lottery drawing to the player, may conduct lottery drawings that select particular game content objects from all the game content objects contained in the deck the remaining number of times and may award the remaining game content objects selected in these lottery drawings to the player.

If multiple lottery games are played in succession using such an information processing device, one of the games is a lottery game, during which game content objects of the preset rarity level or higher (in other words, high-rarity game content objects) can be reliably acquired from the deck. For this reason, it becomes easier to acquire the highest-rarity game content objects from this deck.

In addition, in such an information processing device, the update processing module may additionally delete game content objects not awarded to the player depending on whether or not there are game content objects of the preset rarity level remaining in the deck.

When such an information processing device is used, it becomes possible to additionally reduce the number of game content objects in this deck depending on how many game content objects remain in the deck.

In addition, in such an information processing device, the update processing module may be adapted to additionally delete game content objects not awarded to the player with the proviso that the total number of deletions of game content objects not awarded to the player remains below a predetermined number.

When such an information processing device is used, it is possible to minimize excessive additional deletion of game content objects from this deck.

Next is a non-transitory computer-readable medium including instructions to be performed on a processor for a game, that directs a computer to execute storage processing operations whereby a deck containing multiple game content objects having rarity levels classified according to scarcity values is stored in a memory module;

lottery game processing operations whereby a lottery drawing that selects a particular game content object from game content objects of a preset rarity level or higher among all the game content objects contained in the deck is conducted in response to a lottery drawing operation by the player and whereby the game content object selected in this lottery drawing is awarded to the player; and update processing operations whereby, each time the lottery drawing is conducted, an update of the deck is performed by deleting the game content object awarded to the player among the game content objects of the preset rarity level or higher and, at the same time, additionally deleting game content objects not awarded to the player among the game content objects, excluding the highest-rarity game content objects from the game content objects of the preset rarity level or higher.

In accordance with such a non-transitory computer-readable medium including instructions to be performed on a processor for a game, it becomes easier to acquire the highest-rarity game content objects (in other words, the game content objects the player wants to acquire) from this deck even without increasing the total number of the highest-rarity game content objects contained in the deck.

Next is an information processing method in which a computer stores a deck containing multiple game content objects having rarity levels classified according to scarcity values in a memory module;

conducts a lottery drawing that selects a particular game content object from game content objects of a preset rarity level or higher among all the game content objects contained in the deck in response to a lottery drawing operation by the player and awards the game content object selected in this lottery drawing to the player; and, each time the lottery drawing is conducted, performs an update of the deck by deleting the game content object awarded to the player among the game content objects of the preset rarity level or higher and, at the same time, additionally deleting game content objects not awarded to the player among the game content objects, excluding the highest-rarity game content objects from the game content objects of the preset rarity level or higher.

When such an information processing method is used, it becomes easier to acquire the highest-rarity game content objects (in other words, game content objects the player wants to acquire) from this deck even without increasing the number of highest-rarity game content objects contained in the deck.

Embodiment

<<Regarding Configuration of Game System 1>>

FIG. 1 is a diagram illustrating an exemplary configuration of the entire game system 1. The game system 1 provides various game-related services to the player over a network 2 (for example, the Internet) and includes a server device 10 and multiple player terminals 20.

The game system 1 according to the present embodiment can provide the player with a lottery game whose objective is to acquire character cards (hereinafter referred to as "characters" for brevity), which represent an example of game content.

When the lottery game starts, characters selected from a container deck (also referred to as "deck" for brevity) containing a finite number of characters are awarded to the player as a result of a lottery drawing.

This deck, which contains multiple characters possessing various rarity levels classified according to scarcity values, is configured such that the total number of high-rarity characters contained therein becomes smaller with increasing rarity. For this reason, the higher the rarity of a character, the more difficult it is to acquire.

Then, when such lottery drawings are conducted in a repeated manner and characters are successively awarded to the player, the number of characters contained in the deck progressively decreases until finally there are no more characters in the deck, at which point the player can reliably acquire the desired character (for example, the highest-rarity character in the deck).

The lottery game according to the present embodiment, in addition to a regular game, includes a special game in which characters of a preset rarity level or higher (in other words, high-rarity characters) can be reliably acquired from the deck.

When this special game starts, as a result of a lottery drawing, a particular character is selected from the characters of the preset rarity level or higher among all the characters contained in the deck, and the character selected in this lottery drawing is awarded to the player.

Further, when this lottery drawing is conducted, not only is the character awarded to the player in the lottery drawing deleted from the characters of the preset rarity level or higher in the deck, but game content objects that have not been awarded to this player (except for the highest-rarity characters in the deck) are also additionally deleted.

When lottery drawings are conducted in a repeated manner, characters other than the highest-rarity characters among the characters of the preset rarity level or higher are successively deleted from the deck. As a result, it becomes easier to acquire the highest-rarity characters (in other words, game content objects that a lot of players would like to acquire) from this deck even without increasing the total number of highest-rarity characters contained in the deck.

<<Regarding Configuration of Server Device 10>>

Figure 2:
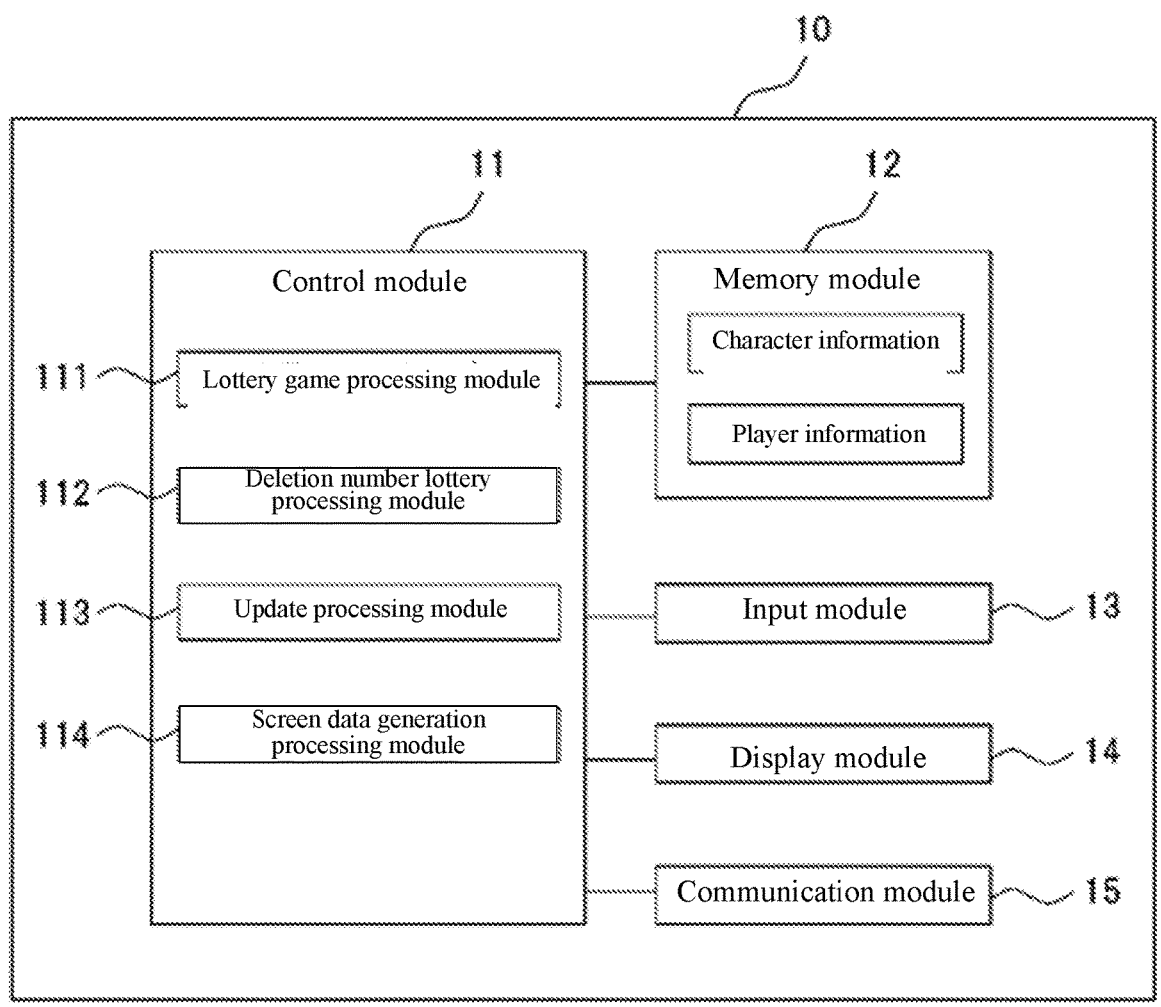
FIG. 2 A block diagram illustrating the functional configuration of the server device 10.

FIG. 2 is a block diagram illustrating the functional configuration of the server device 10. The server device 10 is an information processing device (e.g., a workstation, a personal computer, etc.) used by a system administrator to operate and manage various services. Upon receiving various commands (requests) from the player terminals 20, the server device 10 transmits (responds) non-transitory computer-readable medium including instructions to be performed on a processor (e.g., game programs)/various data that are operational on the player terminals 20, as well as web pages (game screens, etc.) created using a markup language (HTML, etc.) compliant with the specifications of the player terminals 20. The server device 10 has a control module 11, a storage module 12, an input module 13, a display module 14, and a communication module 15.

The control module 11, along with transferring data between the components, exercises overall control over the server device 10, and is implemented using a CPU (Central Processing Unit) that runs a predetermined non-transitory computer-readable medium including instructions to be performed on a processor, stored in memory. The control module 11 of present embodiment is provided with at least a lottery game processing module 111, a deletion number lottery processing module 112, an update processing module 113, and a screen data generation processing module 114.

The lottery game processing module 111 possesses functionality to carry out the processing operations required to run the lottery game in accordance with the non-transitory computer-readable medium including instructions to be performed on a processor (e.g., game program). In the case of a regular game, in response to a lottery drawing operation by the player, the lottery game processing module 111 according to the present embodiment performs a lottery drawing that selects a particular character from among the multiple characters contained in the deck and awards the character selected in this lottery drawing to this player. In addition, in the case of a special game, in response to a lottery drawing operation by the player, this lottery game processing module 111 performs a lottery drawing that selects a particular character from the characters of the preset rarity level or higher among all the characters contained in the deck and awards the character selected in this lottery drawing to this player.

The deletion number lottery processing module 112 possesses functionality to carry out the processing operations that determine the number of characters additionally deleted from the deck using a lottery drawing. In the case of a special game, the deletion number lottery processing module 112 according to the present embodiment determines the number of characters additionally deleted from the deck using a lottery drawing.

The update processing module 113 possesses functionality to carry out the processing operations involved in updating a deck containing multiple characters. The term "deck" refers to a group of characters created by combining multiple characters subject to a lottery drawing into a single set. Each time a lottery drawing is conducted, the update processing module 113 according to the present embodiment performs updating by deleting the characters awarded to the player by the lottery game processing module 111 from the deck. In addition, in the case of a special game, each time a lottery drawing is conducted, this update processing module 113 performs updating by additionally deleting, from the deck, characters that have not been awarded to the player by the lottery game processing module 111.

The screen data generation processing module 114 possesses the functionality to carry out the processing operations required to generate screen data used to display game screens on the player terminals 20. The screen data generation processing module 114 according to the present embodiment generates screen data used to provide a list view of deck-related information to the player. This screen data generation processing module 114 generates HTML data as screen data corresponding to game screens.

The storage module 12, which has a ROM (Read Only Memory), i.e., a read-only storage area in which operating system software is stored, and a RAM (Random Access Memory), i.e., a rewritable storage area used as a work area for arithmetic processing by the control module 11, is implemented using a flash memory, a hard disk, or another non-volatile storage device. The storage module 12 of the present embodiment stores at least character information, player information and other various data. It should be noted that each of these information elements will be described in more detail below.

The input module 13, which is used by a system administrator, etc., to enter various types of data relating to game service (e.g., character information, group information, etc.), is implemented, for example, as a keyboard, a mouse, or the like.

The display module 14, which is used to display an operation screen for use by a system administrator in response to commands from the control module 11, is implemented, for example, as a liquid crystal display (LCD: Liquid Crystal Display), or the like.

The communication module 15, which is used for communication with the player terminals 20, has receiver functionality for receiving various types of data and signals transmitted from the player terminals 20 and transmitter functionality for transmitting various types of data and signals to the player terminals 20 in response to commands from the control module 11. The communication module 15 is implemented, for example, as an NIC (Network Interface Card), or the like.

FIG. 3 is a diagram illustrating an exemplary data structure of character information. This character information has configured therein, in association with character IDs, at least character names and levels of rarity, as well as the initial and maximum values of various parameters, such as maximum attack strength, maximum defense strength, maximum hit point value, initial attack strength, initial defense strength, initial hit point value, and the like.

The "levels of rarity", which represent information indicating the degree of scarcity of characters, are classified into multiple classes according to scarcity value. Here, the levels of rarity are configured such that, in terms of magnitude, "R5">"R4">"R3">"R2">"R1".

FIG. 4 is a diagram illustrating an exemplary data structure of player information. This player information has configured therein, in association with player IDs, at least player names, game points, proprietary character information, deck information, and the total number of deletions.

The game points represent information indicating the value of the points owned by the player (for example, information indicating the quantity of virtual currency and medals that can be used in the game). The player can come into possession of game points by purchasing them with electronic money and the like, acquiring them during the game, etc. The proprietary character information represents information relating to the characters owned by the player (hereinafter referred to as "proprietary characters"). The deck information represents information on the deck allocated to the player. The total number of deletions represents information indicating the total number of characters that have been additionally deleted from the deck so far.

FIG. 5 is a diagram illustrating an exemplary data structure of proprietary character information. This proprietary character information has configured therein, in association with the character IDs of the proprietary characters, the current values of various parameters including, at least, levels, attack strength, defense strength, and hit points.

FIG. 6 is a diagram illustrating an exemplary data structure of deck information. The deck information represents information that defines a deck created by combining a predetermined number of characters that can be awarded to the player into a single set. The deck information has configured therein, in association with character IDs, the levels of rarity, the total number of characters contained, and the current number of characters contained.

The total number of characters contained represents information indicating the number of characters included in the deck in its initial state. The current number of characters contained represents information indicating the number of other characters remaining in the deck after awarding characters to the player. The deck information according to the present embodiment is configured such that the higher the level of rarity of a character, the smaller the total number of such characters contained in the deck. For this reason, in a lottery drawing where this deck is used, the higher the level of rarity of a character, the less likely it is to be selected.

<<Regarding Configuration of Player Terminal 20>>

Figure 7:
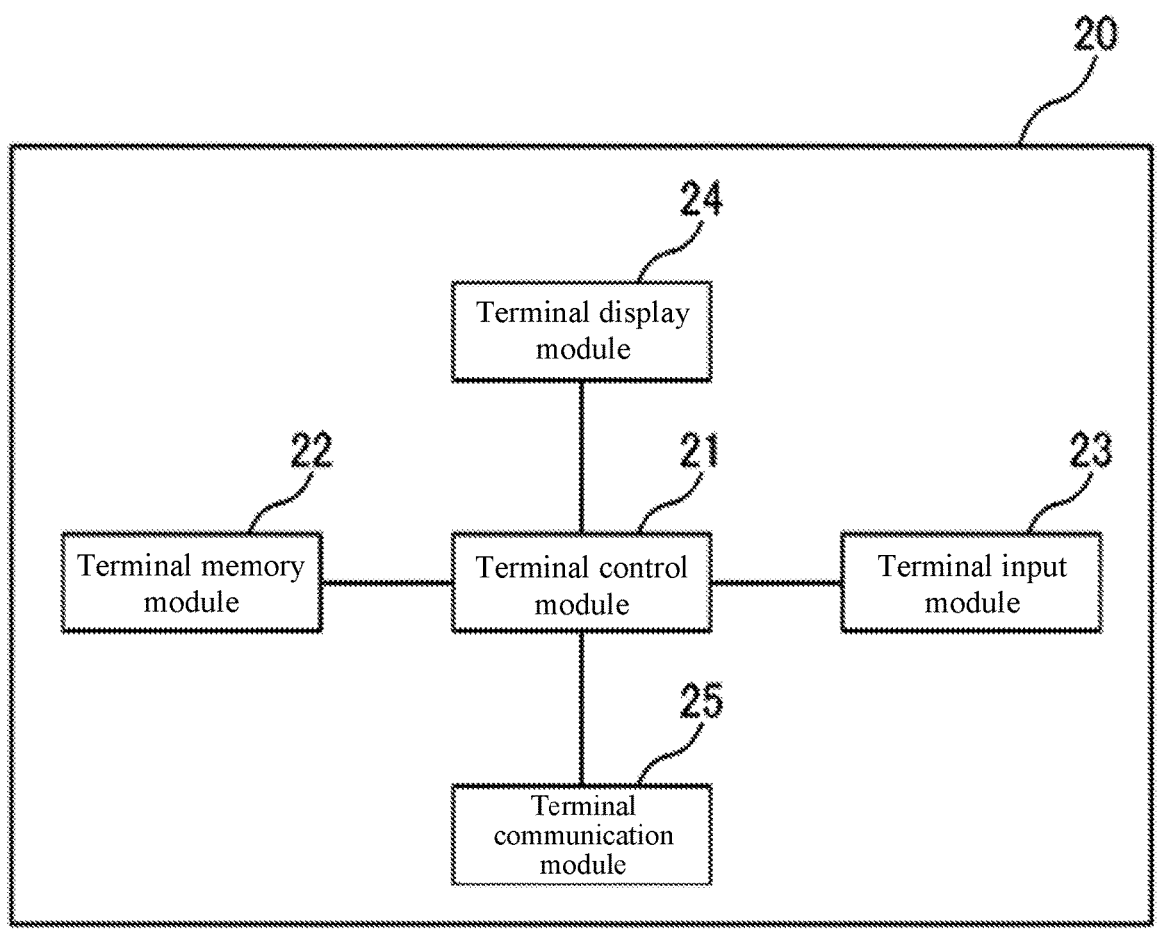
FIG. 7 A block diagram illustrating the functional configuration of a player terminal 20.

FIG. 7 is a block diagram illustrating the functional configuration of a player terminal 20. The player terminal 20 is an information processing device owned and used by the player (for example, a smartphone, a mobile phone terminal, a tablet terminal, etc.). Thanks to the web browser functionality it possesses, the player terminal 20 is capable of on-screen display of web pages (game screens, etc.) transmitted from the server device 10. The player terminal 20 has a terminal control module 21 used for providing overall control over the player terminal 20, a terminal storage module 22 used for storing various types of data and non-transitory computer-readable media including instructions to be performed on a processor (e.g., software programs), a terminal input module 23 used by the player for operation input, a terminal display module 24 used for displaying game screens and operation screens, and a terminal communication module 25 used for communicating information to and from the server device 10.

<<Regarding the Operation of the Game System 1>>

<Special Game>

Figure 8:
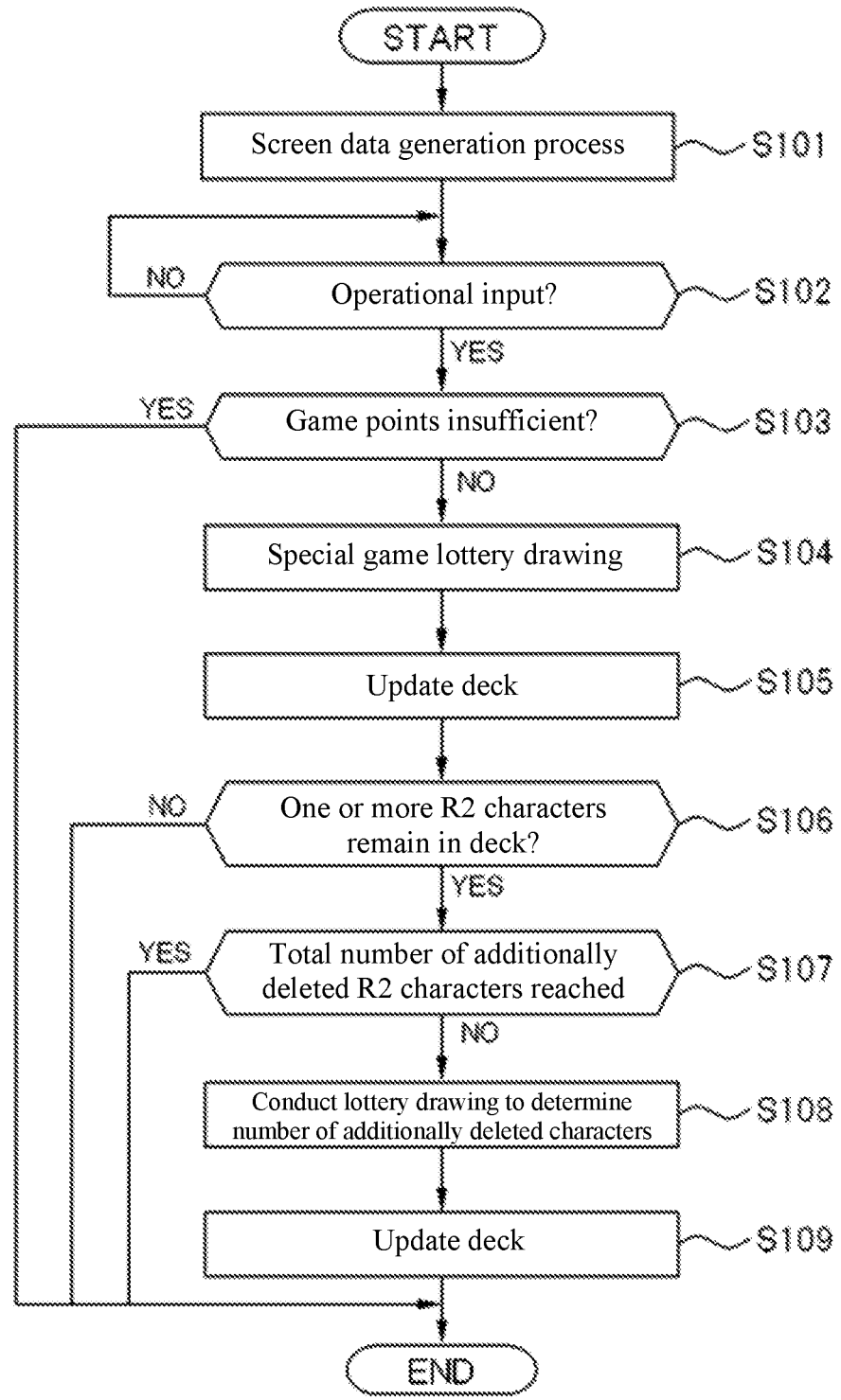
FIG. 8 A flow chart illustrating an example of operation (No. 1) of the game system 1 according to the present embodiment.

FIG. 8 is a flow chart illustrating an example of operation (No. 1) of the game system 1 according to the present embodiment. Special game-related operation will be discussed below in specific detail.

First, upon receiving a request to start a special game from a player terminal 20, the server device 10 directs the screen data generation processing module 114 to generate operation screen data used by the player to play a special game (Step S101).

Specifically, the screen data generation processing module 114 refers to the deck information illustrated in FIG. 6 to acquire the level of rarity of the characters contained in the deck, the total number of characters contained, and the current number of characters contained. Then, based on this acquired data, the screen data generation processing module 114 generates an operation screen that can provide the player with an understanding of the configuration of the deck.

Subsequently, once the operation screen data is generated by this screen data generation processing module 114, the server device 10 transmits this screen data to the requesting player terminal 20. After receiving this screen data transmitted from the server device 10, the player terminal 20 analyzes this screen data and displays a special game operation screen on the terminal display module 24.

Figure 9:
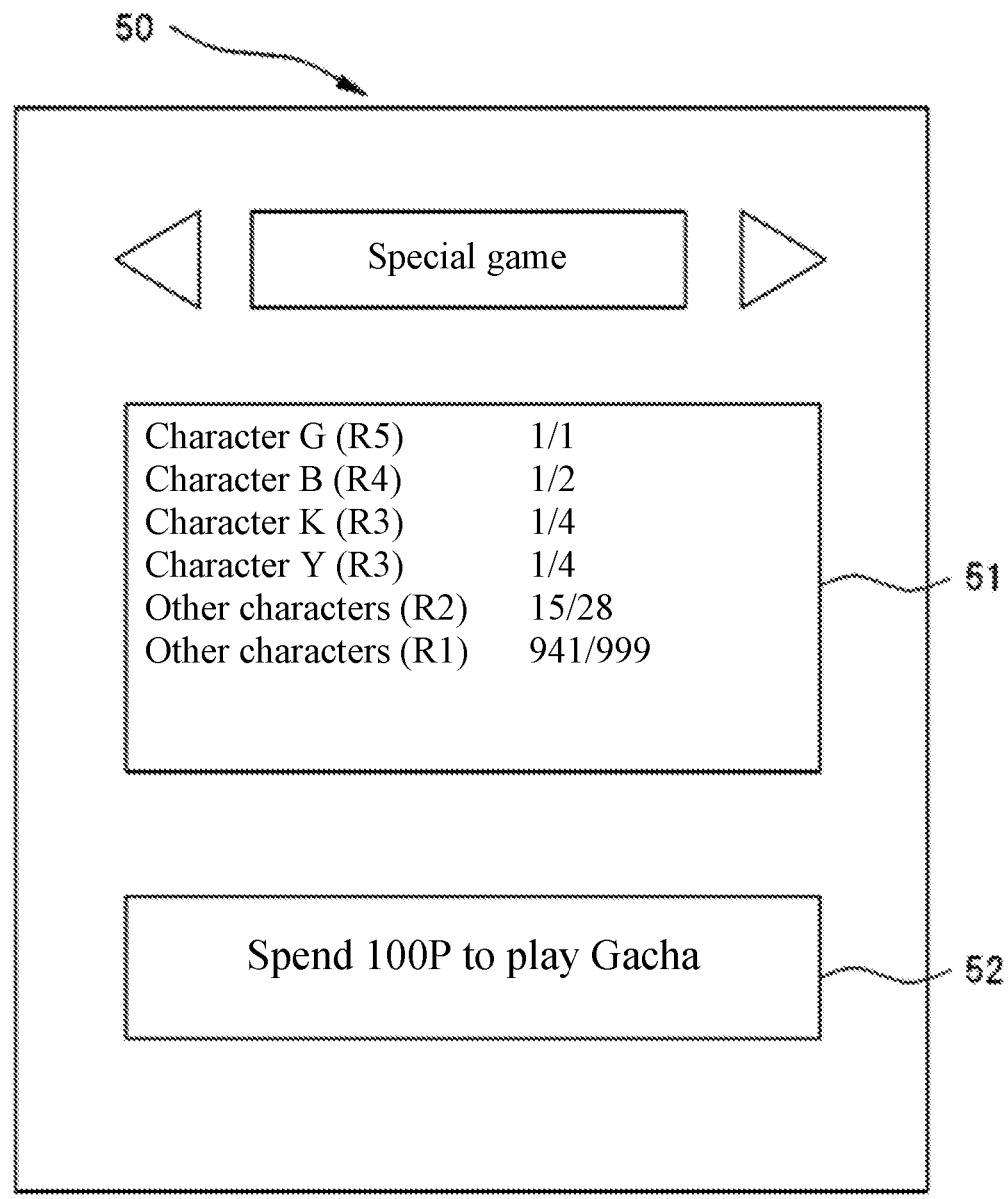
FIG. 9 A diagram illustrating an exemplary operation screen 50 used in a special game.

FIG. 9 is a diagram illustrating an exemplary operation screen 50 used in a special game displayed by the player terminal 20. This operation screen 50 includes a deck configuration display area 51, which shows the configuration of the deck, and a control button 52, which is used to start a special game by spending game points.

The level of rarity, the current number of characters contained, and the total number of characters contained are displayed in the deck configuration display area 51 in association with the characters contained in the deck. Here, one "Character G" with the highest rarity level of "R5", one "Character B" with a rarity level of "R4", one "Character K" with a rarity level of "R3", one "Character Y" with a rarity level of "R3", 15 other characters with a rarity level of "R2", and 941 other characters with the lowest rarity level of "R1" are currently contained in the deck.

In this manner, when the player selects the control button 52 while the operation screen 50 is displayed, the player terminal 20 transmits operational information based on this player's lottery drawing operation to the server device 10.

Next, the server device 10 determines whether or not operational information transmitted from the player terminal 20 has been received (Step S102).

Namely, if the lottery game processing module 111 determines that no operational information from the player terminal 20 has been received (Step S102: NO), it remains in standby mode until the operational information is transmitted from the player terminal 20. On the other hand, if it is determined that the operational information from the player terminal 20 has been received (Step S102: YES), control advances to the processing operations of the next Step S103.

Subsequently, if the operational information from the player terminal 20 has been received, the server device 10 determines whether or not the player's game points are insufficient (Step S103).

Specifically, based on the player ID and the like received along with the operational information from the player terminal 20, the lottery game processing module 111 refers to the player information illustrated in FIG. 4 and acquires this player's game points. Then, based on these acquired game points, the lottery game processing module 111 determines whether or not the player is in possession of the game points required to conduct a special game (for example, 100 points).

Then, if it is determined that the game points are insufficient (Step S103: YES), the lottery game processing module 111 terminates this process. On the other hand, if it is determined that the game points are not insufficient (Step S103: NO), control advances to the processing operations of the next Step S104.

Next, if the player's game points are not insufficient, the server device 10 executes the processing operations required for a special game lottery drawing (Step S104).

Specifically, first, based on the player ID and the like received along with the operational information from the player terminal 20, the lottery game processing module 111 refers to the player information illustrated in FIG. 4 and acquires this player's game points. The game points required to conduct a special game (for example, 100 points) are then subtracted from these acquired game points.

Next, the lottery game processing module 111 refers to the player information illustrated in FIG. 4 and acquires this player's deck information (see FIG. 6). The lottery game processing module 111 then refers to this acquired deck information and extracts the characters of the preset rarity level or higher among all the characters contained in this player's deck. Here, assuming that "R2" has been configured as the preset rarity level, all the characters with a rarity level of "R2" or higher are extracted as high-rarity characters.

After that, the lottery game processing module 111 selects a particular character from the extracted characters with a rarity level of "R2" or higher (characters of the preset rarity level or higher) using a lottery drawing and awards this selected character to the player. At such time, this player's proprietary character information (see FIG. 5) is updated.

Subsequently, when the processing operations required for a special game lottery drawing are completed in this manner, the server device 10 executes processing operations required to update the deck (Step S105).

Specifically, the update processing module 113 updates this player's deck information (see FIG. 6) such that the character awarded to the player by the lottery game processing module 111 is deleted from the deck. Here, the particular character selected from the characters with a rarity level of "R2" or higher (characters of the preset rarity level or higher) in the lottery drawing is deleted from the deck.

Subsequently, the server device 10 determines whether or not there are 1 or more characters with a rarity level of "R2" (characters of the preset rarity level) remaining in the deck (Step S106).

Specifically, the update processing module 113 refers to the player information illustrated in FIG. 4 and acquires this player's deck information (see FIG. 6). The update processing module 113 then refers to this acquired deck information and performs a search to determine whether or not there are 1 or more characters with a rarity level of "R2" (characters of the preset rarity level) among the characters contained in this player's deck. A successful search means that there remain 1 or more characters with a rarity level of "R2" (characters of the preset rarity level).

Then, if it is determined that not a single character with a rarity level of "R2" (characters of the preset rarity level) remain in the deck (Step S106: NO), the update processing module 113 terminates this process. On the other hand, if it is determined that 1 or more characters with a rarity level of "R2" (characters of the preset rarity level) remain in the deck (Step S106: YES), control advances to the processing operations of the next Step S107.

Subsequently, if it has been determined that 1 or more characters with a rarity level of "R2" (characters of the preset rarity level) remain in the deck, the server device 10 determines whether or not the total number of deletions of characters with a rarity level of "R2" (characters of the preset rarity level) additionally deleted from the deck has reached a predetermined number (Step S107).

Specifically, the update processing module 113 refers to the player information illustrated in FIG. 4 and acquires the total number of deletions for this player. The update processing module 113 then determines whether or not this player's total number of deletions has reached the predetermined number by comparing the acquired total number of deletions for the player with the predetermined number (for example, 15).

Then, if it is determined that the total number of deletions of characters with a rarity level of "R2" (characters of the preset rarity level) additionally deleted from the deck has reached the predetermined number (Step S107: YES), the update processing module 113 terminates this process. On the other hand, if it is determined that the total number of deletions of characters with a rarity level of "R2" (characters of the preset rarity level) additionally deleted from the deck has not reached the predetermined number (Step S107: NO), control advances to the processing operations of the next Step S108.

Subsequently, it if has been determined that the total number of deletions of characters with a rarity level of "R2" (characters of the preset rarity level) additionally deleted from the deck has not reached the predetermined number, the server device 10 determines the number of the characters with a rarity level of "R2" (characters of the preset rarity level) to be additionally deleted from the deck using a lottery drawing (Step S108).

Specifically, the number of the characters with a rarity level of "R2" to be additionally deleted from the deck is randomly selected from a range of 1 to 3 by the deletion number lottery processing module 112. In other words, a maximum of 3 characters with a rarity level of "R2" can be additionally deleted from the deck.

Subsequently, when the number of the characters with a rarity level of "R2" to be additionally deleted from the deck in this manner is determined using a lottery drawing, the server device 10 executes the processing operations required to update the deck (Step S109).

Specifically, the update processing module 113 updates this player's deck information (see FIG. 6) such that characters other than the characters awarded to the player by the lottery game processing module 111 in the above-described Step S104 (in other words, characters that have not been awarded to the player) among the characters with a rarity level of "R2" (characters of the preset rarity level) are additionally deleted from the deck according to the quantity determined by the deletion number lottery processing module 112 in the above-described Step S108. Here, particular characters randomly selected from the characters with a rarity level of "R2" (characters of the preset rarity level) are additionally deleted from the deck.

As described above, when a special game in which characters with a rarity level of "R2" or higher (characters of the preset rarity level or higher) can be reliably acquired from the deck is conducted in the game system 1 according to the present embodiment, not only are the characters with a rarity level of "R2" or higher (characters of the preset rarity level or higher) awarded to the player in a lottery drawing deleted from the deck, but characters with a rarity level of "R2" (characters of the preset rarity level) that have not been awarded to this player are also additionally deleted from the deck. Consequently, when the special game is conducted in a repeated manner, characters with a rarity level of "R2" (characters of the preset rarity level) are successively removed from the deck. As a result, the high-scarcity characters with a rarity level of "R5", a rarity level of "R4", or a rarity level of "R3", which many players would like to have, become easier to acquire even without increasing the total number of such characters in the deck.

<Continuous Drawing>

Figure 10:
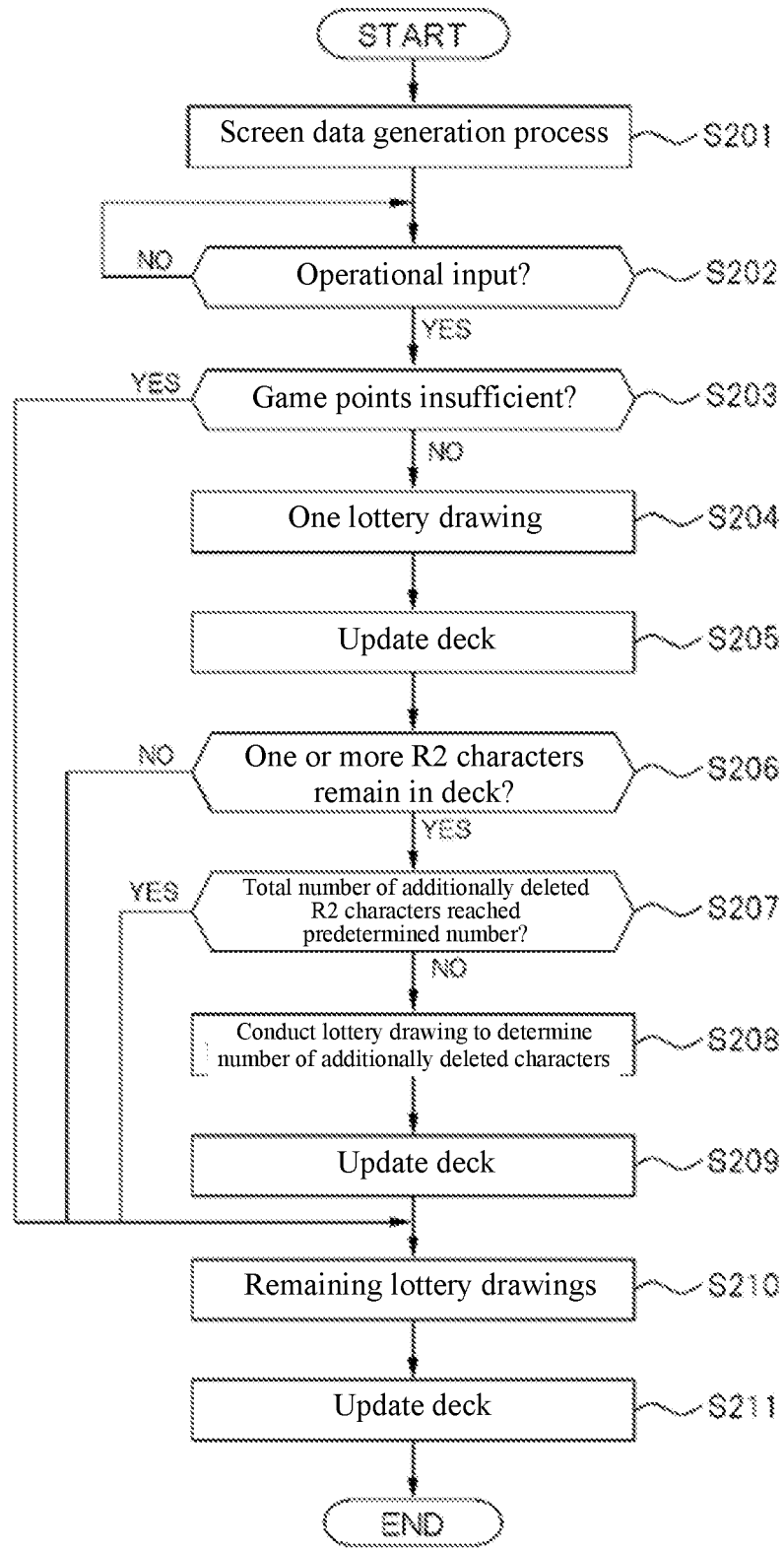
FIG. 10 A flow chart illustrating an example of operation (No. 2) of the game system 1 according to the present embodiment.

FIG. 10 is a flow chart illustrating an example of operation (No. 2) of the game system 1 according to the present embodiment. Special game operation with multiple lottery drawings conducted in succession is explained in specific detail below. It should be noted that the processing operations of steps S205 through S209 illustrated in FIG. 10 are substantially the same as the processing operations of steps S105 through S109 illustrated in FIG. 8 and thus will not be discussed.

First, upon receiving a request to start a special game from a player terminal 20, the server device 10 directs the screen data generation module processor 114 to generate operation screen data used by the player to play a special game (Step S201).

Specifically, the screen data generation processing module 114 refers to the deck information illustrated in FIG. 6 to acquire the level of rarity of the characters contained in the deck, the total number of characters contained, and the current number of characters contained. Then, based on this acquired data, the screen data generation processing module 114 generates an operation screen that can provide the player with an understanding of the configuration of the deck.

Figure 11:
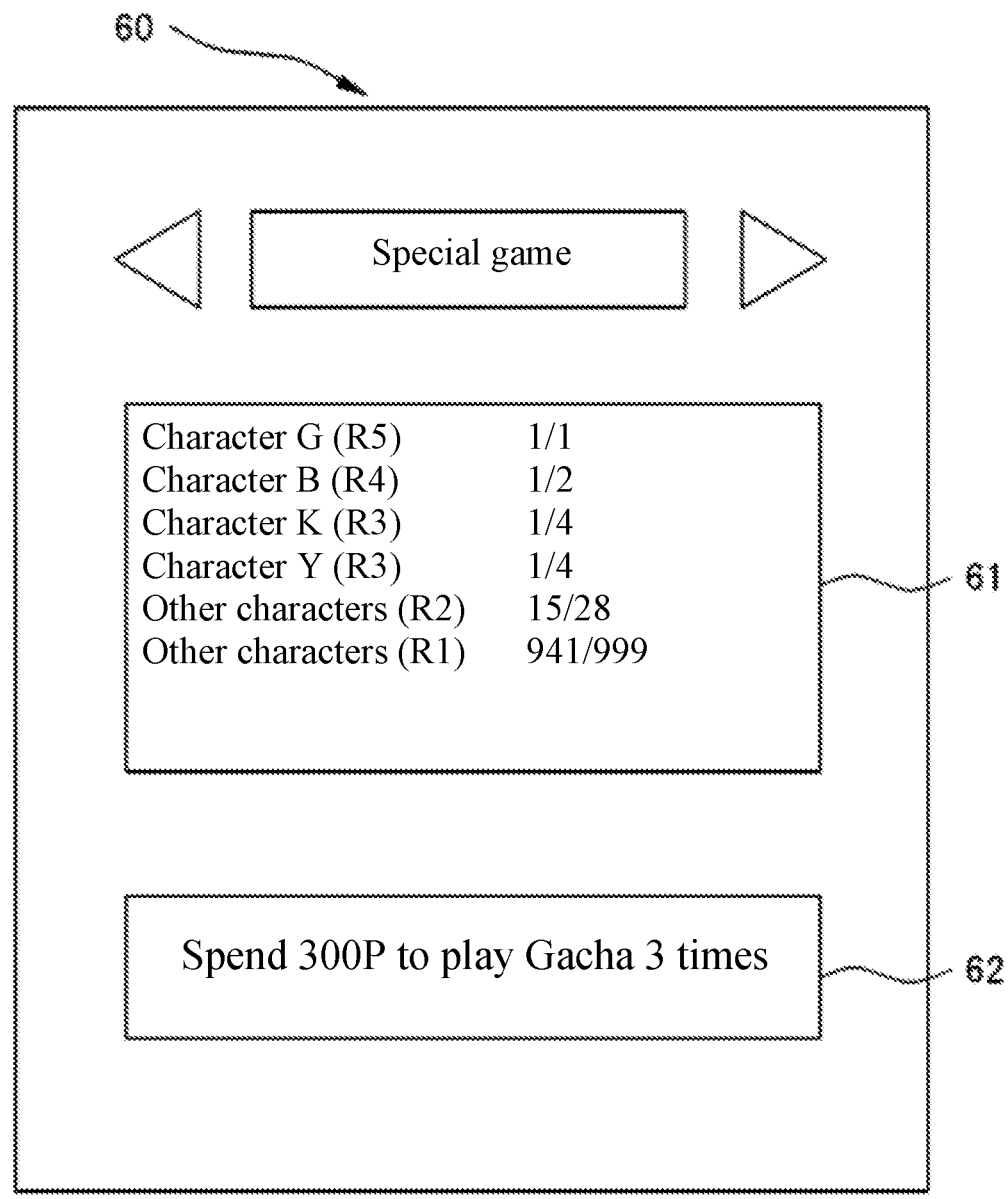
FIG. 11 A diagram illustrating an exemplary operation screen 60 used in a special game.

FIG. 11 is a diagram illustrating an exemplary operation screen 60 used in a special game displayed by the player terminal 20. This operation screen 60 includes a deck configuration display area 61, which shows the configuration of the deck, and a control button 62, which is used to continuously play a special game by collecting and spending multiple drawings' worth of game points.

In this manner, when the player selects the control button 62 while the operation screen 60 is displayed, the player terminal 20 transmits operational information based on this player's continuous drawing operation to the server device 10.

Next, the server device 10 determines whether or not operational information transmitted from the player terminal 20 has been received (Step S202).

Namely, if the lottery game processing module 111 determines that no operational information from the player terminal 20 has been received (Step S202: NO), it remains in standby mode until the operational information is transmitted from the player terminal 20. On the other hand, if it is determined that the operational information from the player terminal 20 has been received (Step S202: YES), control advances to the processing operations of the next Step S203.

Subsequently, if the operational information from the player terminal 20 has been received, the server device 10 determines whether or not the player's game points are insufficient (Step S203).

Specifically, based on the player ID and the like received along with the operational information from the player terminal 20, the lottery game processing module 111 refers to the player information illustrated in FIG. 4 and acquires this player's game points. Then, based on these acquired game points, the lottery game processing module 111 determines whether or not the player is in possession of the game points required to conduct a special game of multiple drawings in succession (for example, 300 points).

Then, if it is determined that the game points are insufficient (Step S203: YES), the lottery game processing module 111 terminates this process. On the other hand, if it is determined that the game points are not insufficient (Step S203: NO), control advances to the processing operations of the next Step S204.

Next, if the player's game points are not insufficient, the server device 10 executes the processing operations required for a single lottery drawing (Step S204).

Specifically, first, based on the player ID and the like received along with the operational information from the player terminal 20, the lottery game processing module 111 refers to the player information illustrated in FIG. 4 and acquires this player's game points. The game points required to conduct a multiple game of multiple drawings in succession (for example, 300 points) are then subtracted from these acquired game points.

Next, the lottery game processing module 111 refers to the player information illustrated in FIG. 4 and acquires this player's deck information (see FIG. 6). The lottery game processing module 111 then refers to this acquired deck information and extracts the characters of the preset rarity level or higher among all the characters contained in this player's deck. Here, assuming that "R2" has been configured as the preset rarity level, all the characters with a rarity level of "R2" or higher are extracted as high-rarity characters.

Next, the lottery game processing module 111 selects only one particular character from the extracted characters with a rarity level of "R2" or higher (characters of the preset rarity level or higher) using a lottery drawing and awards this selected character to the player. At such time, this player's proprietary character information (see FIG. 5) is updated.

Subsequently, after completing the processing operations of steps S205 through S209 (the processing content of steps S205 through S209 is similar to the processing content of the above-described steps S105 through S109), the server device 10 executes processing operations required for the remaining drawings in the same manner as the processing operations required for a regular game (Step S210).

Specifically, the lottery game processing module 111 refers to the player information illustrated in FIG. 4 and acquires this player's deck information (see FIG. 6). Then, based on this acquired deck information, the lottery game processing module 111 selects all the remaining characters from all the characters contained in this player's deck using a lottery drawing and awards the selected remaining characters to the player. At such time, this player's proprietary character information (see FIG. 5) is updated.

Subsequently, when the remaining lottery drawings are completed in this manner, the server device 10 executes processing operations required to update the deck (Step S211).

Specifically, the update processing module 113 updates this player's deck information (see FIG. 6) such that all the remaining characters awarded to the player by the lottery game processing module 111 are deleted from the deck.

As described above, when multiple lottery drawings are conducted in a successive manner in the game system 1 according to the present embodiment, during one of the drawings, a lottery game is conducted in which characters with a rarity level of "R2" or higher (characters of the preset rarity level or higher) can be reliably acquired from the deck, and not only are characters with a rarity level of "R2" or higher (characters of the preset rarity level or higher) awarded to the player in this lottery drawing deleted from the deck, but the characters with a rarity level of "R2" (characters of the preset rarity level) that have not been awarded to this player are also additionally deleted from the deck. Consequently, when this lottery drawing is conducted in a repeated manner, characters with a rarity level of "R2" (characters of the preset rarity level) are successively removed from the deck. As a result, the high-scarcity characters with a rarity level of "R5", a rarity level of "R4", or a rarity level of "R3", which many players would like to have, become easier to acquire even without increasing the total number of such characters in the deck.

Other Embodiments

The foregoing embodiment was intended to facilitate the understanding of the present invention and is not to be construed as limiting of the present invention. The present invention can be modified and improved without departing from its spirit and the present invention includes equivalents thereto. In particular, the embodiments described below are also included in the present invention.

<Characters Subject to Deletion>

Although the present embodiment as described above has been discussed with reference to a case in which the update processing module 113 additionally deletes characters of a preset rarity level from the deck, the present invention is not limited thereto.

For example, characters satisfying predetermined conditions with respect to parameters other than the level of rarity (for example, other levels or attributes) may be additionally deleted from the deck.

In addition, it may be left up to the player to select the conditions that the characters should meet in order to be additionally deleted from the deck by the update processing module 113.

For example, by selecting characters having specific attributes (or characters that don't have specific attributes), the player may additionally delete these characters from the deck. In addition, for example, by selecting characters with preset rarity levels or higher, the player may additionally delete these characters from the deck.

<Level of Rarity Subject to Deletion>

Although the present embodiment, as described above, has been discussed with reference to a case in which not only are characters with a rarity level of "R2" or higher (characters of the preset rarity level or higher) awarded to the player in a lottery drawing deleted from the deck, but characters with a rarity level of "R2" (characters of the preset rarity level) that have not been awarded to this player are also additionally deleted from the deck, the present invention is not limited thereto.

For example, not only characters with a rarity level of "R2" that have not been awarded to this player (characters of the preset rarity level), but also characters with a rarity level of "R3" or characters with a rarity level of "R4" that have not been awarded to this player may also be selected as the characters to be additionally deleted from this deck. In other words, the update processing module 113 may also additionally delete other characters among characters with a rarity level of "R2" or higher (characters of the preset rarity level or higher) except for those with the highest rarity level of "R5". As a result, it becomes easier to acquire characters with a rarity level of "R5" from this deck even without increasing the total number of the characters with the highest rarity level of "R5" contained in the deck.

In addition, although the present embodiment, as described above, has been discussed with reference to a case in which characters with a rarity level of "R2" (characters of the preset rarity level) are additionally deleted from the deck only during one lottery drawing in a situation where multiple lottery drawings are performed in a successive manner during a special game, the present invention is not limited thereto.

For example, during a single lottery drawing, not only are characters with a rarity level of "R2" or higher (characters of the preset rarity level or higher) awarded to the player in a lottery drawing deleted from the deck, but characters with a rarity level of "R2" (characters of the preset rarity level) that have not been awarded to this player may also be additionally deleted from the deck. In addition, during the remaining lottery drawings, not only are characters awarded to the player in a lottery drawing deleted from the deck, but characters with a rarity level of "R1" (characters with the lowest level of rarity in the deck) that have not been awarded to this player may also be additionally deleted from the deck.

Therefore, repeating lottery drawings the remaining number of times, the characters with a rarity level of "R1" (characters with the lowest level of rarity in the deck) are also successively additionally deleted from the deck. Consequently, it becomes easier, on the one hand, to acquire characters with the highest rarity level of "R5" during one lottery drawing, and, on the other hand, it becomes easier to acquire characters with a rarity level of "R2" or higher during the remaining lottery drawings.

<Deletion Number Lottery Processing Module>

Although the present embodiment, as described above, has been discussed with reference to a case in which the deletion number lottery processing module 112 selects the number of characters with a rarity level of "R2" (characters of the preset rarity level) to be additionally deleted from the deck from a range of 1 to 3 using a lottery drawing, the present invention is not limited thereto.

For example, the deletion number lottery processing module 112 may randomly select the number of characters with a rarity level of "R2" (characters of the preset rarity level) to be additionally deleted from the deck from a range of 0 to 3. In other words, a lottery drawing may create a situation in which no additional characters with a rarity level of "R2" (characters of the preset rarity level) are deleted from the deck.

In addition, for example, if during the current lottery drawing the deletion number lottery processing module 112 selects 1 as the number of characters to be additionally deleted from the deck, then 3 may definitely be selected during the next lottery drawing.

<Total Number of Deletions, Game Points>

Although the present embodiment, as described above, has been discussed with reference to a case in which it is determined in the above-described Step S107 whether or not the total number of deletions of characters with a rarity level of "R2" (characters of the preset rarity level) additionally deleted from the deck has reached a predetermined number, the deletion number limitation may be eliminated by omitting this condition test.

In addition, although the present embodiment, as described above, has been discussed with reference to a case in which it is determined in the above-described steps S103 and S203 whether or not the game points are insufficient, the lottery game may be adapted to permit gameplay without spending points by omitting this condition test.

<Deck Resetting>

In the present embodiment, as described above, once all the characters have been removed from the deck, the update processing module 113 performs a data update such that the current number of the characters contained in the deck is brought into correspondence with the total number of characters contained therein, thereby returning the configuration of the deck to its initial state. As a result, the player can continue playing this lottery game.

In addition, in the present embodiment, as described above, the update processing module 113 may return the configuration of this deck to the initial state if the lottery game processing module 111 selects the character with the highest rarity level of "R5" in the deck in a lottery drawing and awards it to the player. As a result, the player can play the lottery game in a state in which a character with the highest rarity level of "R5" is contained in the deck at all times.

In addition, in the present embodiment, as described above, if the configuration of the deck reverts to the initial state, the deck may be reset either by a player operation or automatically.

<Game Content>

Although the present embodiment has been described above with reference to character cards, the present invention is not limited thereto. For example, the content of the game may be represented, for example, by the characters themselves, by figures, and by tools, or by abilities and other items used in the game, so long as it is represented by electronic game data.

<Server Device>

Although the present embodiment has been described above with reference to a game system 1 equipped with a single server device 10 as an example of a service device, the present invention is not limited thereto and a game system 1 equipped with multiple server devices 10, as an example of server devices, may also be used. In other words, multiple server devices 10 may be connected over a network 2 and these server devices 10 may perform various types of processing in a distributed manner. It should be noted that the server device 10 is an example of a computer.

<Information Processing Device>

In the game system 1 used in the present embodiment as described above, the explanations are given with reference to a case in which various types of information processing are carried out by directing the server device 10 and the player terminals 20 to cooperate based on a non-transitory computer-readable medium including instructions to be performed on a processor. The present invention, however, is not limited thereto and the above-mentioned various types of information processing may be carried out based on the non-transitory computer-readable medium including instructions to be performed on a processor using the server device 10 alone or the player terminals 20 alone as information processing devices.

In addition, a configuration may be used in which the player terminals 20 support part of the information processing device functionality. In such a case, the server device 10 and player terminals 20 constitute an information processing device. It should be noted that the information processing device is an example of a computer equipped with a processor and a memory.

DESCRIPTION OF THE REFERENCE NUMERALS

1 Game system
2 Network
10 Server device
11 Control module
12 Memory module
13 Input module
14 Display module
15 Communication module
20 Player terminal
21 Terminal control module
22 Terminal memory module
23 Terminal input module
24 Terminal display module
25 Terminal communication module
50 Control screen
51 Deck configuration display area
52 Control button
60 Operation screen
61 Deck configuration display area 62 Control button
111 Lottery game processing module
112 Deletion number lottery processing module
113 Update processing module
114 Screen data generation processing module

The invention claimed is:

1. A server system comprising:
a memory which stores
an object data structure that associates each of a plurality of game content objects with a rarity level and one or more parameters, wherein the rarity level represents a scarcity of the associated game content object, and
a deck data structure that associates each of one or more decks with two or more of the plurality of game objects; and
at least one processor configured to
generate a graphical user interface for conducting a lottery drawing from one of the one or more decks, and
conduct the lottery drawing by, over one or more iterations, in response to an input by a player through the graphical user interface,
selecting one of the two or more game content objects associated with the one deck in the deck data structure and associated with a preset rarity level or higher in the object data structure,
associating the selected game content object with a player identifier of the player in a player data structure to thereby award the selected game content object to the player, and
updating the one deck by disassociating the selected game content object from the one deck in the deck data structure to thereby delete the selected game object from the one deck, and disassociating one or more additional game content objects, which were not awarded to the player and which are associated with the preset rarity level or higher, excluding one or more highest rarity levels, from the one deck in the deck data structure to thereby delete the one or more additional game content objects from the one deck.

2. The server system of claim 1, wherein the preset rarity level or higher, excluding one or more highest rarity levels, consists of only the preset rarity level.

3. The server system of claim 1, wherein updating the one deck further comprises randomly determining a number of the one or more additional game content objects to be deleted from the one deck.

4. The server system of claim 1, wherein the one or more iterations consist of only a single iteration, and wherein the at least one processor conducts the lottery drawing by, over one or more subsequent iterations:
selecting one of the two or more game content objects associated with the one deck in the deck data structure;
associating the selected game content object with the player identifier of the player in the player data structure to thereby award the selected game content object to the player; and
updating the one deck by disassociating the selected game content object from the one deck in the deck data structure to thereby delete the selected game object from the one deck, without disassociating any additional game content objects from the one deck in the deck data structure.

5. The server system of claim 1, wherein the at least one processor is further configured to end the lottery drawing when no game content objects of the preset rarity level are associated with the one deck in the deck data structure.

6. The server system of claim 1, wherein the one or more iterations comprise an initial iteration and one or more subsequent iterations, and wherein the at least one processor conducts the lottery drawing by, over the one or more subsequent iterations, only deleting the one or more additional game content objects while a total number of additional game content objects that have been deleted over all prior iterations remains below a predetermined number.

7. A non-transitory computer-readable medium including instructions to be performed on a processor, wherein the instructions, when executed by the processor, cause the processor to:
store
an object data structure that associates each of a plurality of game content objects with a rarity level and one or more parameters, wherein the rarity level represents a scarcity of the associated game content object, and
a deck data structure that associates each of one or more decks with two or more of the plurality of game objects;
generate a graphical user interface for conducting a lottery drawing from one of the one or more decks; and
conduct the lottery drawing by, over one or more iterations, in response to an input by a player through the graphical user interface,
selecting one of the two or more game content objects associated with the one deck in the deck data structure and associated with a preset rarity level or higher in the object data structure,
associating the selected game content object with a player identifier of the player in a player data structure to thereby award the selected game content object to the player, and
updating the one deck by disassociating the selected game content object from the one deck in the deck data structure to thereby delete the selected game object from the one deck, and disassociating one or more additional game content objects, which were not awarded to the player and which are associated with the preset rarity level or higher, excluding one or more highest rarity levels, from the one deck in the deck data structure to thereby delete the one or more additional game content objects from the one deck.

8. The non-transitory computer-readable medium according to claim 7, wherein the preset rarity level or higher, excluding one or more highest rarity levels, consists of only the preset rarity level.

9. The non-transitory computer-readable medium according to claim 7, wherein updating the one deck further comprises randomly determining a number of the one or more additional game content objects to be deleted from the one deck.

10. The non-transitory computer-readable medium according to claim 7, wherein the one or more iterations consist of only a single iteration, and wherein the instructions cause the processor to conduct the lottery drawing by, over one or more subsequent iterations:
selecting one of the two or more game content objects associated with the one deck in the deck data structure;
associating the selected game content object with the player identifier of the player in the player data structure to thereby award the selected game content object to the player; and updating the one deck by disassociating the selected game content object from the one deck in the deck data structure to thereby delete the selected game object from the one deck, without disassociating any additional game content objects from the one deck in the deck data structure.

11. The non-transitory computer-readable medium according to claim 7, wherein the instructions further cause the processor to end the lottery drawing when no game content objects of the preset rarity level are associated with the one deck in the deck data structure.

12. The non-transitory computer-readable medium according to claim 7, wherein the one or more iterations comprise an initial iteration and one or more subsequent iterations, and wherein the instructions cause the processor to conduct the lottery drawing by, over the one or more subsequent iterations, only deleting the one or more additional game content objects while a total number of additional game content objects that have been deleted over all prior iterations remains below a predetermined number.

13. A computer-implemented method, comprising:
storing
an object data structure that associates each of a plurality of game content objects with a rarity level and one or more parameters, wherein the rarity level represents a scarcity of the associated game content object, and
a deck data structure that associates each of one or more decks with two or more of the plurality of game objects;
generating a graphical user interface for conducting a lottery drawing from one of the one or more decks; and
conducting the lottery drawing by, over one or more iterations, in response to an input by a player through the graphical user interface,
selecting one of the two or more game content objects associated with the one deck in the deck data structure and associated with a preset rarity level or higher in the object data structure,
associating the selected game content object with a player identifier of the player in a player data structure to thereby award the selected game content object to the player, and
updating the one deck by disassociating the selected game content object from the one deck in the deck data structure to thereby delete the selected game object from the one deck, and disassociating one or more additional game content objects, which were not awarded to the player and which are associated with the preset rarity level or higher, excluding one or more highest rarity levels, from the one deck in the deck data structure to thereby delete the one or more additional game content objects from the one deck.

14. The computer-implemented method according to claim 13, wherein the preset rarity level or higher, excluding one or more highest rarity levels, consists of only the preset rarity level.

15. The computer-implemented method according to claim 13, wherein updating the one deck further comprises randomly determining a number of the one or more additional game content objects to be deleted from the one deck.

16. The computer-implemented method according to claim 13, wherein the one or more iterations consist of only a single iteration, and wherein conducting the lottery drawing further comprises, over one or more subsequent iterations:
selecting one of the two or more game content objects associated with the one deck in the deck data structure;
associating the selected game content object with the player identifier of the player in the player data structure to thereby award the selected game content object to the player; and
updating the one deck by disassociating the selected game content object from the one deck in the deck data structure to thereby delete the selected game object from the one deck, without disassociating any additional game content objects from the one deck in the deck data structure.

17. The computer-implemented method according to claim 13, wherein conducting the lottery drawing further comprises ending the lottery drawing when no game content objects of the preset rarity level are associated with the one deck in the deck data structure.

18. The computer-implemented method according to claim 13, wherein the one or more iterations comprise an initial iteration and one or more subsequent iterations, and wherein conducting the lottery drawing comprises, over the one or more subsequent iterations, only deleting the one or more additional game content objects while a total number of additional game content objects that have been deleted over all prior iterations remains below a predetermined number.

* * * * *